(12) United States Patent
Hu et al.

(10) Patent No.: US 7,407,526 B2
(45) Date of Patent: Aug. 5, 2008

(54) FOOD ADDITIVE

(75) Inventors: Bo Hu, Greensburg, PA (US); Fredrik Eklund, Göteborg (SE); Nils Jonsson, Helsingborg (SE); Fredrik Persson, Helsingborg (SE)

(73) Assignee: Höganäs AB, Höganäs (SE)

( * ) Notice: Subject to any disclaimer, the term of this patent is extended or adjusted under 35 U.S.C. 154(b) by 538 days.

(21) Appl. No.: 10/995,471

(22) Filed: Nov. 24, 2004

(65) Prior Publication Data

US 2005/0145068 A1  Jul. 7, 2005

Related U.S. Application Data

(60) Provisional application No. 60/530,667, filed on Dec. 19, 2003.

(30) Foreign Application Priority Data

Nov. 26, 2003 (SE) .................................. 0303187

(51) Int. Cl.
*B22F 1/00* (2006.01)
*B22F 9/20* (2006.01)
*B22F 9/22* (2006.01)

(52) U.S. Cl. .............................. 75/255; 75/353; 75/354; 75/359; 75/360; 75/369; 75/484

(58) Field of Classification Search .................. 75/356, 75/359, 443, 452, 484, 354, 360, 369, 252, 75/353, 414, 415
See application file for complete search history.

(56) References Cited

U.S. PATENT DOCUMENTS

| 2,310,383 | A | * | 2/1943 | Andrews et al. ............. 424/630 |
|---|---|---|---|---|
| 3,214,262 | A | * | 10/1965 | Hans-Jurgen et al. ......... 75/356 |
| 3,419,383 | A | * | 12/1968 | Harr et al. ...................... 75/359 |
| 4,054,443 | A | * | 10/1977 | Jaco, Jr. ......................... 75/359 |
| 4,752,479 | A | | 6/1988 | Briggs et al. |
| 5,248,492 | A | * | 9/1993 | Groman et al. ............ 424/9.32 |
| 5,713,982 | A | * | 2/1998 | Clark et al. ................... 75/359 |
| 5,972,066 | A | * | 10/1999 | Lehtinen .................... 75/10.63 |
| 6,048,382 | A | * | 4/2000 | Greenwalt .................... 75/436 |
| 6,521,247 | B1 | | 2/2003 | deVries |
| 6,589,667 | B1 | | 7/2003 | Hultman et al. |
| 2003/0110889 | A1 | * | 6/2003 | Uenosono et al. ............. 75/359 |

FOREIGN PATENT DOCUMENTS

GB         704026         2/1954

OTHER PUBLICATIONS

International-Type Search Report dated Jun. 4, 2004.

* cited by examiner

*Primary Examiner*—Roy King
*Assistant Examiner*—Ngoclan T. Mai
(74) *Attorney, Agent, or Firm*—Buchanan Ingersoll & Rooney PC

(57) ABSTRACT

The invention concerns an iron powder for fortifying foodstuff. The powder consists of a reduced iron powder having irregularly shaped particles, wherein the iron powder has a ratio AD:PD less than 0.3, wherein AD is the apparent density in $g/cm^3$, and PD is the particle density in $g/cm^3$. The specific surface area of the powder particles is above 300 $m^2/kg$ as measured by the BET method and the average particle size is between 5-45 μm.

20 Claims, 2 Drawing Sheets

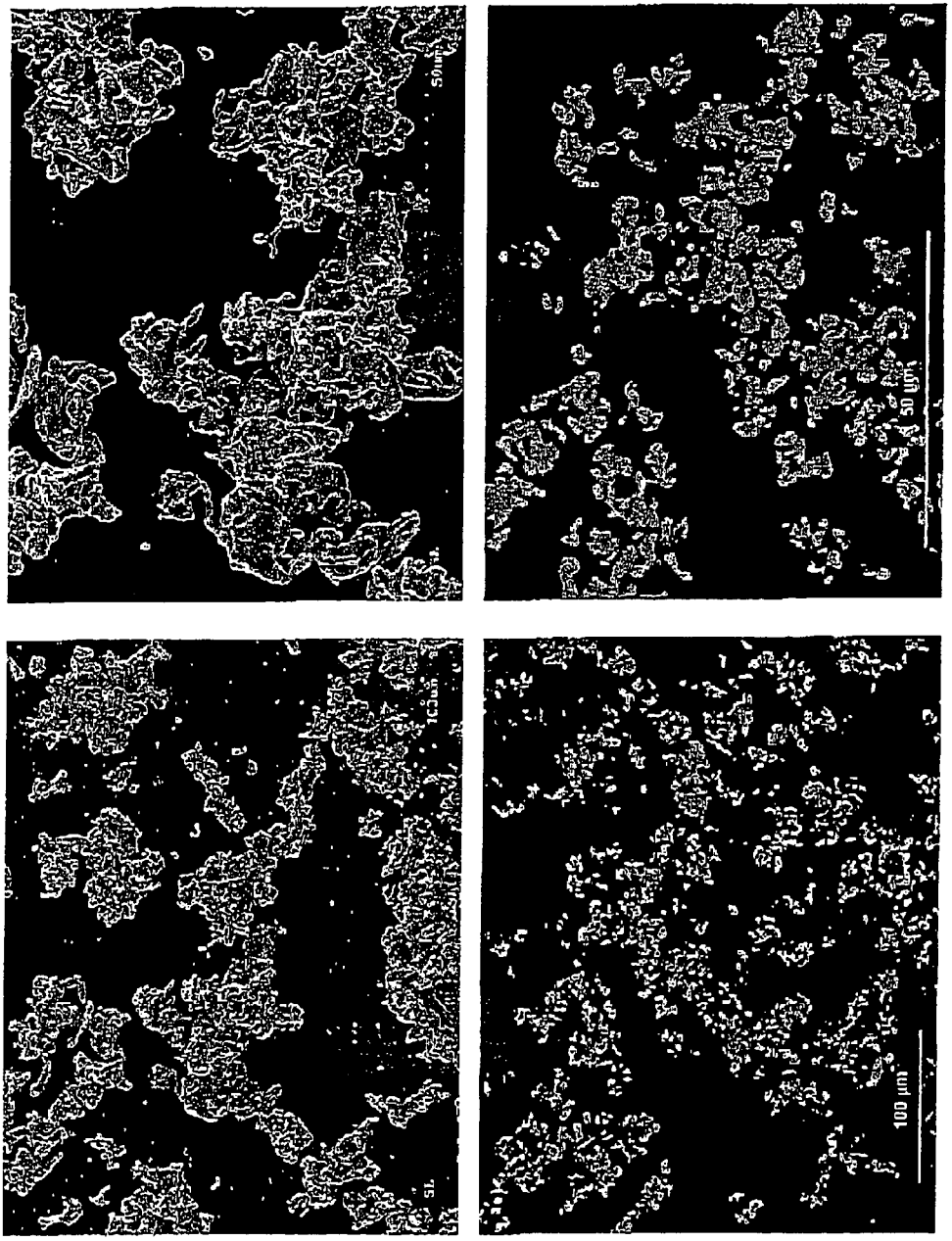
Figure 1-Powder A

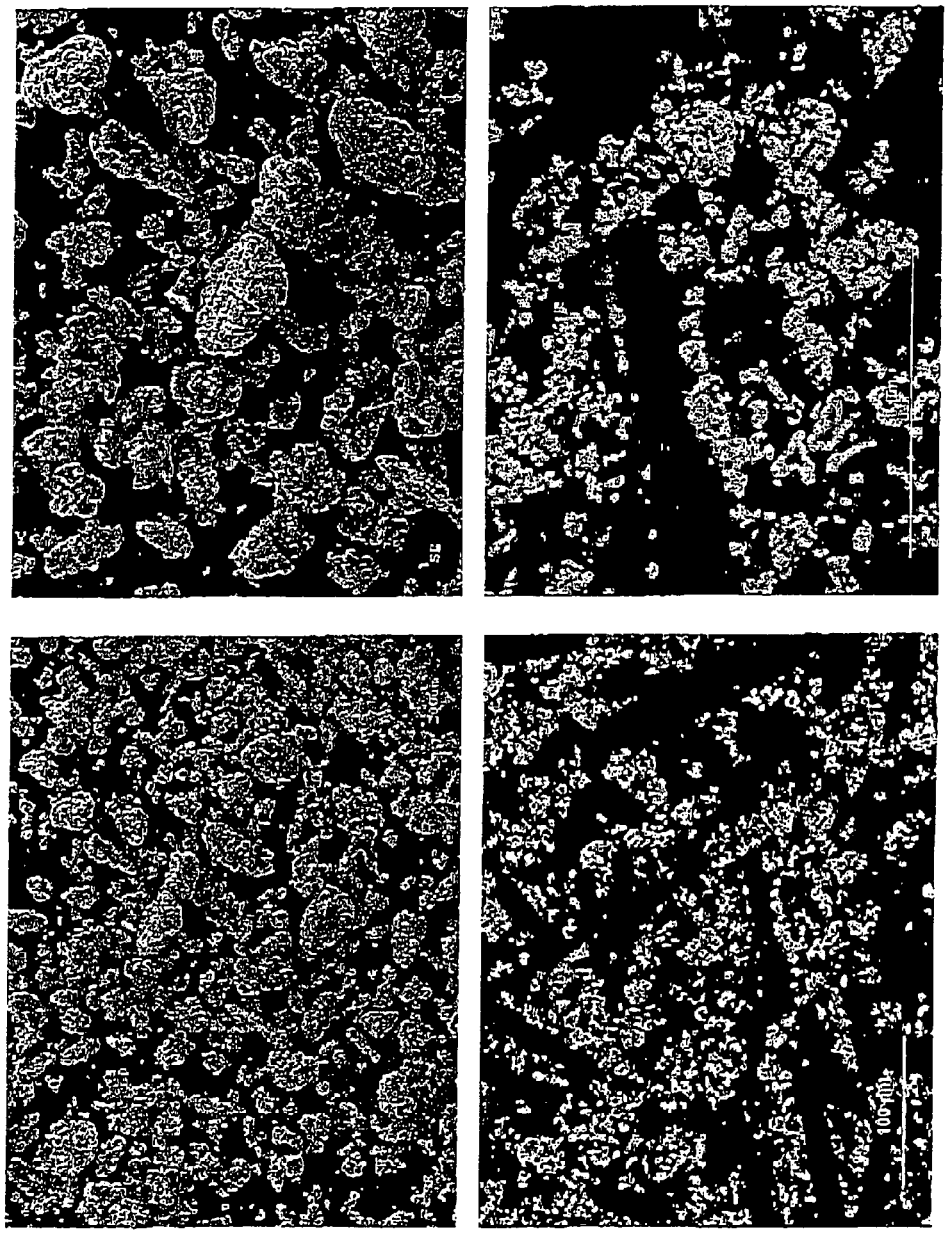
Figure 2-Powder B

FOOD ADDITIVE

The benefit is claimed under 35 U.S.C. §119(a)-(d) of Swedish Application No. 0303187-9, filed Nov. 26, 2003, and under 35 U.S.C. §119(e) of U.S. Provisional Application No. 60/530,667, filed Dec. 19, 2003.

FIELD OF THE INVENTION

The present invention concerns food and feed fortification. More specifically the invention concerns an iron powder, which is suitable as food and feed additive and which can be cost effectively produced.

BACKGROUND OF THE INVENTION

Iron is an essential trace element in animal and human nutrition. It is a component of heme in hemoglobin and of myoglobin, cytochromes and several enzymes. The main role of iron is its participation in the transport, storage and utilization of oxygen. A balanced diet will normally cover the need of iron through intake of iron rich food stuff such as vegetables, meat and cereals. An important iron source is cereals such as wheat flour. However in modern methods of producing wheat flour the iron rich shell of the wheat grain is eliminated. This results in that the iron content of wheat flour of today is lower than that of wheat flour produced before. Iron deficiency is also a consequence of the malnutrition which is pre-vailing especially in the developing countries. As a diet with too low iron content contributes to low birth weights impairs growth and cognitive development in children and causes fatigue among adults there is a need of adding iron to the diet. The greatest effect of an iron fortification program will of course be reached when iron is added to food that most people eat daily.

The most widespread method is iron fortification of cereal products such as wheat flour, corn flour, corn flakes etc. but many other products are also fortified.

Iron can be added to food and feed in many different forms. Metallic iron can be used as well as inorganic salts of iron, such as iron sulphate, and organic salts, such as iron gluconate or iron fumarate. There are basically three different types of elemental iron for food fortification, namely reduced iron or sponge iron, carbonyl iron and electrolytic iron.

The reduced iron is produced by a reduction of ground iron oxide with hydrogen or carbon monoxide at elevated temperature followed by grinding and milling of the reduced iron cake. Reduced iron is produced from either iron ore or mill scale. The purity of the product is dictated by the purity of the iron oxide. These products have the lowest purity of the food grade iron powders when compared with-electrolytic or carbonyl powders. The most common impurity in iron powder produced by any reduction process is oxygen, most of which occurs as a thin film of surface oxide. Basic impurities include carbon, magnesium, aluminium, silicon, phosphorus, sulphur, chromium, manganese, nickel and copper, many of which are present as oxides. The particle size is irregular and porous and it consists of a number of small equiaxed grains.

Carbonyl iron powders consist of particles, which are much finer than particles of other iron powders. These powders are produced by treating reduced iron with carbon monoxide under heat and pressure. The resulting iron pentacarbonyl is later decomposed under controlled conditions yielding an iron powder and carbon monoxide gas. At this point the major impurity is carbon and further reduction in wet hydrogen is necessary to remove most of the carbon. The powder has particles ranging in size from 0.5 to 10 µm in diameter and is of high purity. The particles are close to spherical in shape and very dense and smooth. The structure of the particles is characterized by concentric shells arranged in onion-skin fashion. The carbonyl process is costly.

Electrolytic iron is produced by electrolytic deposition of a hard brittle metal that is mechanically comminuted. The particle shape of electrolytic iron powder is irregular, dendritic of fernlike, from which it receives its high surface factor.

An important feature for the iron containing compounds used as food additive is the bioavailability of the iron i.e. how efficiently the iron is absorbed by the body. Of the iron powders used for food and feed enrichment today, the carbonyl and electrolytic powders have the highest bioavailability but the production costs of these powders are high compared with the production costs for reduced iron powders. A pure reduced iron powder, which has high bioavailability and which can be cost effectively produced would therefore be attractive and is the object of the present invention.

The assessment of bioavailability may be performed in different ways such as in vitro studies, animal studies or human studies. Bioavailability of iron powders as well as other iron compounds are usually measured relative to iron sulphate.

SUMMARY OF THE INVENTION

According to the invention it has now been found that satisfactory bioavailability of iron can be obtained with a reduced iron powder having irregularly shaped particles, wherein the iron powder has a ratio AD:PD less than 0.3, wherein AD is the apparent density in $g/cm^3$ and wherein PD is the particle density in $g/cm^3$. Additionally the specific surface area of the powder particles should be above 300, preferably above 400 $m^2/kg$ as measured by the BET method, and the average particle size should be between 5 and 45, preferably between 5 and 25 µm.

A fortifying amount (about 1 to 200 ppm) of such a powder should be included in a foodstuff or feedstuff.

DETAILED DESCRIPTION OF THE INVENTION

Starting Materials

The iron oxide used as starting material may be natural hematite ($Fe_2O_3$). Another alternative is to use the type of iron oxides which are obtained as by-products from acid regeneration processes. In order to obtain a product having the desired properties the particle size of the starting material should preferably not exceed 55 µm Production Process The reduction of the starting material is performed with hydrogen gas or a mixture of carbon and hydrogen gas. Preferably the reduction is performed in a belt furnace at temperatures up to 1100° C. An important feature is that the reduction is performed in such a way that the resulting product is in the form of a powder or a slightly sintered cake which can easily be milled without any impact or with only slight impact on the particle shape and other properties.

A process for the production of a sponge iron powder for metallurgical purposes is disclosed in the GB patent 704026. This patent teaches that in order to obtain such a powder the particle size of the starting material should be below about 150 µm (100 mesh) and not exceed that of the final product. Furthermore it is disclosed that the starting material could be reduced with solid or gaseous reducing agent at such temperature that sintered sponge iron cakes are formed. After cooling the sintered cakes are comminuted to the desired size.

By way of example it is specifically disclosed that a magnetite concentrate is reduced with charcoal at a temperature of 1000° C.

Another reduction process is disclosed in the U.S. Pat. No. 5,713,982. This process is preferably performed in such a way that the iron oxide powder is incrementally heated to approximately 1200° F. (649° C.), then to approximately 1400° F. (760° C.) and finally to approximately 1500° F. (816° C.) in a reducing atmosphere. Hydrogen is preferably used as reducing atmosphere. According to this known process, an iron powder, the particles of which are rounded, are obtained. This known powder is stated to be useful for injection moulding processes.

According to the present invention it has been found that, in order to obtain a satisfactory dissolution rate and bioavailability, the iron particles obtained after the reduction should have an irregular shape. It has been found that the critical feature can be obtained by performing the reduction of the iron oxide powder at somewhat higher temperature and/or somewhat longer heating times than what is disclosed in the US patent. As an example a combination of carbon and hydrogen gas can be used as the reducing agents at a temperature of about 1000° C. The exact conditions for the preparation of iron powders having the irregularly shaped particles can be determined by the man skilled in the art.

Characterisation of the Product

An important and critical feature of the powder is the porous and irregular shape and consequently the low apparent density, AD, which has been found to be preferably less than 2 g/cm$^3$. Furthermore, the pores of the powder should be open, facilitating the penetration of the gastric juice into the iron particles giving a sufficient high dissolution rate of the iron. A low-degree of open porosity is manifested in a value of particle density close to the value of the true density of iron, which is about 7.86 g/cm$^3$. It has then be found that the relation between AD and PD should be less than 0.3.

As used herein the particle density, PD, is measured by using a pycometer apparatus, which allows liquid to flow into open pores of the iron particles in a container of definite volume under controlled conditions. The particle density is defined as the particle mass divided by the particle volume, including the inside closed pores. As the liquid fluid was 5% of a 99.5% ethanol solution used. The weight of the pycnometer, the pycnometer including the iron powder sample, and the pycnometer including the iron powder sample filled with the penetration fluid up to the definite volume were measured. As the definite volume of the pycnometer and the density of the penetrating fluid is known the particle density can then be calculated.

The particle size of the iron powder particles is also a parameter influencing the dissolution rate. A too coarse particle size will negatively influence the dissolution rate and a too fine particle size of the iron powder increase the risk for dust explosions during handling. A sufficiently high dissolution rate is obtained when the average particle size is between 5 and 45 preferably between 5 and 25 μm.

Bioavailability

As method for assessing the bioavailability of the iron powder we have used a method including the steps of dissolving the 50 g iron powder in hydrochloric acid at pH 1 and 37° C. The amount of dissolved iron is measured after 30 minutes and is reported as dissolution rate in table 2 below. According to the present invention it has been found that the iron powder should have a dissolution rate in hydrochloric acid at 37° C. and pH 1 of at least 40% by eight after 30 minutes.

Although described particularly with reference to food applications it is obvious that the iron powder according to the present invention can be used also within other fields where rapid dissolution is required.

The invention is further illustrated by the following non-limiting examples.

EXAMPLE 1

This example discloses a process for the preparation of an iron powder, which has high bioavailability as measured by the dissolution rate and which can be used as food or feed fortification.

Hematite with a grain size of 5-20 μm was mixed with coal having a grain size less than 1 mm. The amount of added coal was 12% by weight. The obtained mixture was reduced in an furnace at about 1000° C. Hydrogen gas was added at the end of the furnace and forced to flow in a direction counter the flow of the hematite material. The added amount of hydrogen gas was 610 m$^3$/ton of reduced iron. The obtained cake of sponge iron was gently crushed in a standard milling device and sieved on a 325 mesh screen.

FIG. 1 is a micro photograph of the iron powder produced.

EXAMPLE 2

The process according to example 1 was repeated but the reduction was performed with hydrogen only and the starting material used was an iron oxide which had been obtained as a by product from acid regeneration.

FIG. 2 is a micro photograph of the iron powder produced according to this example.

A comparison between the new powders A and B according to the above examples 1 and 2, respectively, and presently used iron powders for food fortification is disclosed in the following, wherein Table 1 lists the type of powders and Table 2 the properties of these powders.

TABLE 1

| Powder | Type of powder | Particle shape | |
|---|---|---|---|
| A | Reduced iron oxide | irregular | According to the invention |
| B | reduced iron oxide | irregular | According to the invention |
| C | Reduced iron oxide | irregular | Commercially available |
| D | Reduced iron oxide | spherical | According to U.S. Pat. No. 6589667 |
| E | Reduced iron oxide | irregular | Commercially available |
| F | Reduced iron oxide | irregular | Commercially available |
| G | Reduced iron oxide | irregular | Commercially available |
| H | electrolytic | irregular | Commercially available |
| I | carbonyl | spherical | Commercially available |

TABLE 2

| Powder type | Apparent density (AD) g/cm3 | Particle Density (PD) g/cm3 | AD/PD | Specific surface area BET m$^2$/kg | Dissolution rate % |
|---|---|---|---|---|---|
| A | 1.37 | 7.31 | 0.19 | 560 | 69–79 |
| B | 1.7 | 7.47 | 0.23 | 550 | 49.3 |
| C | 2.39 | 6.76 | 0.35 | 280 | 37–39 |

TABLE 2-continued

| Powder type | Apparent density (AD) g/cm3 | Particle Density (PD) g/cm3 | AD/PD | Specific surface area BET m²/kg | Dissolution rate % |
|---|---|---|---|---|---|
| D | 2.22 | 7.2 | 0.31 | 260 | 35–40 |
| E | 3.07 | 7.67 | 0.4 | 110 | 30–35 |
| F | 2.57 | 7.6 | 0.34 | 80 | 28–30 |
| G | 2.42 | 7.31 | 0.33 | 230 | 35–36 |
| H | 2.27 | 7.28 | 0.31 | 350 | 71–74 |
| I | 2.35 | 7.82 | 0.30 | 490 | 94–95 |

The contents of As, Hg and Pb in the powders according to the invention were all below the critical limits accepted in iron powders for food fortification.

The invention claimed is:

1. Iron powder consisting essentially of a reduced iron powder having irregularly shaped particles, wherein the iron powder has a ratio AD:PD less than 0.3, wherein AD is the apparent density in g/cm³, and PD is the particle density in g/cm³, the specific surface area of the powder particles is above 300 m²/kg as measured by the BET method and wherein the average particle size is between 5-45 μm.

2. Powder according to claim 1, wherein the specific surface area of the powder particles is above 400, m²/kg and the average particle size is 5-25 μm.

3. Powder according to claim 1, wherein the ratio AD:PD is less than 0.27.

4. Powder according to claim 1, wherein the iron powder has a dissolution rate in hydrochloric acid at 37° C. and pH 1 of at least 40 % by weight after 30 minutes.

5. A foodstuff, feedstuff or beverage comprising the iron powder of claim 1.

6. A fortified material comprising a foodstuff or beverage and a fortifying amount of a reduced iron powder according to claim 1.

7. Method for producing a reduced iron powder as defined in claim 1 comprising the steps of:
   providing a starting material of an iron oxide powder having a particle size less than 55 μm,
   reducing said powder at a temperature less than 1100° C. to a porous sintered cake, and
   crushing and sieving the obtained cake to a powder having the desired particle size.

8. Method according to claim 7, wherein the iron oxide is selected from the group consisting of natural hematite ($Fe_2O_3$) and iron oxides which are obtained as by-products from acid regeneration processes.

9. Method according to claim 7, wherein the reduction is performed with hydrogen gas or a mixture of carbon and hydrogen gas.

10. Method according to claim 7, wherein the reduction is performed in a belt furnace.

11. Powder according to claim 1, wherein the specific surface area of the powder particles is above 450 m²/kg and the average particle size is 5-25 μm.

12. Powder according to claim 1, wherein the specific surface area of the powder particles is above 500 m²/kg and the average particle size is 5-25 μm.

13. Powder according to claim 2, wherein the ratio AD:PD is less than 0.27.

14. Powder according to claim 1, wherein the ratio AD:PD is less than 0.25.

15. Powder according to claim 2, wherein the ratio AD:PD is less than 0.25.

16. Powder according to claim 2, wherein the iron powder has a dissolution rate in hydrochloric acid at 37° C. and pH 1 of at least 40% by weight after 30 minutes.

17. Powder according to claim 3, wherein the iron powder has a dissolution rate in hydrochloric acid at 37° C. and pH 1 of at least 40% by weight after 30 minutes.

18. Method according to claim 8, wherein the reduction is performed with hydrogen gas or a mixture of carbon and hydrogen gas.

19. Method according to claim 8, wherein the reduction is performed in a belt furnace.

20. Method according to claim 9, wherein the reduction is performed in a belt furnace.

* * * * *